United States Patent Office 3,058,906
Patented Oct. 16, 1962

3,058,906
CATALYTIC HYDROCRACKING OF NITROGE-
NOUS FEED STOCKS
Laurence O. Stine, Western Springs, Kenneth D. Vesely,
Berwyn, and Jack R. Schoenfeld, Oak Park, Ill., assignors to Universal Oil Products Company, Des Plaines,
Ill., a corporation of Delaware
No Drawing. Filed Sept. 25, 1959, Ser. No. 842,221
12 Claims. (Cl. 208—111)

This invention relates to a process for the conversion of relatively high boiling hydrocarbons or hydrocarbon mixtures in the presence of hydrogen and a catalyst and more particularly to an improved method of effecting the boiling point reduction of a nitrogen-containing charge stock utilizing certain catalysts having both cracking and hydrogenation activity, which catalysts have heretofore been regarded as impractical for this purpose because of their extreme propensity to become rapidly deactivated upon exposure to nitrogen, either basic or total, present in the feed stock. Specifically, the present invention is directed to the addition of a halogen-containing compound and water into the hydrocracking zone concurrently with the feed whereby the nitrogen-deactivating effect is virtually completely overcome and the activity of the hydrocracking catalyst is maintained at a high level over a prolonged period of time.

Hydrocracking, also known as destructive hydrogenation or hydrogenolysis, is well know in the petroleum industry and refers to the treatment of heavier hydrocarbons and mixtures thereof with hydrogen under selected conditions of temperature and pressure such that carbon-to-carbon linkages are cleaved and hydrogen is added to the resulting molecular fragments to produce smaller, more stable molecules usually containing a higher percentage of hydrogen than the parent compound. The desired reactions include not only the splitting of long chain paraffins and saturation of olefins but also the reduction of aromatics to corresponding naphthenes, the opening of aromatic or naphthenic rings to yield straight and branched-chain paraffins, the breaking of one ring of a condensed aromatic to produce a monocyclic compound and dealkylation of aryl and alkyl compounds. Generally speaking, better yields and product quality make hydrocracking more desirable than other types of cracking for any stock. The charge stocks most suited to hydrocracking are heavy hydrocarbons boiling above the gasoline range and not readily susceptible to catalytic cracking or reforming because of their coke-forming tendencies and the poor liquid yields obtainable thereby. Such charge materials include, for example, primary distillates from the distillation of coal, wood, and shale, asphalt and asphaltenes, heavy residual, refractory cyclic stocks from catalytic cracking, vacuum gas oils, and the like. The resulting product is usually substantially saturated and may comprise, in some instances, a gasoline fraction of greatly improved octane number, in other instances middle distillates such as kerosenes and jet fuels, and in still other instances lubricating oils.

In the early days of the art, hydrogenolysis was effected non-catalytically; that is, attempts were made, with only limited success, to control the degree of conversion and the product distribution on a solely thermal basis without the aid of catalyst. Today, however, catalysts are widely employed in order to permit the use of lower temperatures and pressures, to reduce the rate of coke formation, and, most importantly, to achieve a controlled or selective cracking of the charge whereby a maximum yield of distillate fuels and gasolines and a minimum yield of normally gaseous hydrocarbons and hydrogen is realized. In many instances, through proper selection of catalysts and operating conditions, it is possible to attain liquid volume yields in excess of 100%. The prior art has suggested numerous hydrocracking catalysts of which the more widely utilized include the oxides and sulfides of molybdenum and tungsten, mixed-metal catalyts such as nickel-copper, nickel-alumina, cobalt molybdate, copper-zinc oxide, and the like, which are moderately active and are able to resist poisoning by sulfur and nitrogen present in the feed. Another class of catalysts, having a much greater activity and selective cracking ability utilizes the combination of a solid acidic cracking component or base impregnated with a hydrogenatively active metal. Such catalysts are particularly desirable in that they enable the hydrocracking to proceed at temperatures well below 800° F. for example, in the range of 600°–700° F., in contrast to usual operating temperatures in excess of 800° F., little or no thermal cracking occurs and liquid yields are correspondingly high. The acidic cracking component is usually a synthetic refractory oxide comprising two or more oxides of the elements of groups II, III, and IV of the periodic table, particularly silica-alumina, silica-zirconia, silica-magnesia, silica-thoria, silica-alumina-zirconia, alumina-magnesia, silica-thoria, silica-alumina-zirconia, alumina-boria, etc.; another desirable cracking component is a halogen-promoted alumina, especially an alumina having combined therewith a relatively large percentage of fluorine or chlorine. Typical hydrogenatively active metals comprise the metals of groups VI and VIII of the periodic table, particularly molybdenum, cobalt, nickel, platinum, palladium, and the oxides, sulfides and salts thereof. Unfortunately, however, these catalysts, in spite of their highly desirable properties, have heretofore been deemed totally unsatisfactory for processing nitrogenous charge stocks since a charge containing greater than about 1 part per million of nitrogen causes a very rapid deactivation of the catalyst by poisoning the acid activity thereof, and nearly all commonly encountered residual oils, cycle stocks, etc. contain combined nitrogen in amounts ranging from 5 to 5000 parts per million or more. Experience has shown that hydrocracking carried out in the presence of acidic cracking-hydrogenation catalysts can be successfully accomplished only if the charge stock is substantially nitrogen-free. Efforts to remove nitrogen from the feed, or to reduce the content thereof to tolerable limits, by pretreating means such as a high pressure catalytic hydrogenating step prior to introducing the feed to the hydrocracking zone, have proven largely unsuccessful, or, at best, uneconomical.

Surprisingly, it has now been discovered that the nitrogen sensitivity of the above described hydrocracking catalysts is virtually completely negatived by simultaneously introducing into the hydrocracking zone a halogen-containing compound and water concurrently with the feed. The mechanism by which this effect is achieved is not precisely known but, without intending the present invention to be limited by theoretical considerations, it is believed that the water and halide together act on nitrogenous compounds, under hydrocracking conditions, to combine with the nitrogen contained therein and render it unavailable to attack the catalyst. It has further been discovered, as the following examples will demonstrate, that the use of either halide or water alone, without the other, is completely ineffective in preventing nitrogen deactivation of the catalyst, and in some cases may even accelerate its deactivation. It is therefore apparent that the essential invention herein results from a true combination of two elements and does not consist in merely additive properties thereof. The addition of halide and water to the cracking zone is effective with a wide variety of cracking-hydrogenation catalysts, including those that are free of combined halogen as well as those that are halogen-promoted.

It is, therefore, a primary object of the present invention to provide a process for hydrocracking a nitrogenous charge stock utilizing a solid catalyst comprising an acidic cracking component and a hydrogenatively active metal, while avoiding the nitrogen-deactivating effect heretofore encountered with such catalysts.

It is a principal feature of this invention to inject a halide and water into the feed stream or directly into the hydrocarcking zone whereby the activity of the catalyst is maintained at its normally high level.

Another object of the present invention is to provide a hydrocracking process yielding a completely saturated distillate fuel fraction.

Still another object of the instant invention is to provide a highly selective hydrocracking process which produces as little as 0.5% by weight of $C_4$ materials and lighter.

Yet another object of the present invention is to provide a hydrocracking process producing a recycle stock which is less refractory than the charge and may therefore be recycled to extinction.

These and other objectives and advantages of the present invention will be apparent from the accompanying disclosure and examples.

In one embodiment, this invention provides an improvement in the hydrogenative cracking of a relatively high boiling hydrocarbon charge to yield a lower boiling product wherein said charge is subjected to contact at hydrocracking conditions in a conversion zone with a hydrocracking catalyst, which improvement comprises introducing to said conversion zone a halogen-containing compound and water substantially concurrently with said charge.

In a more limited embodiment, the present invention provides an improvement in the hydrogenative cracking of a nitrogen-containing, relatively high boiling hydrocarbon charge to yield a lower boiling product wherein said charge is subjected to contact at hydrocracking conditions in a conversion zone with a catalyst comprising an acidic refractory inorganic oxide and a constituent selected from the group consisting of the metals of groups VI and VIII of the periodic table, which improvement comprises introducing to said conversion zone an organic halide and water substantially concurrently with said charge.

In a specific embodiment, this invention provides an improvement in the hydrogenative cracking of a nitrogen-containing, relatively high boiling hydrocarbon charge to yield a lower boiling product wherein said charge is subjected to contact in a conversion zone at a temperature of from about 200° to about 900° F., a pressure of from about 10 to about 300 atmospheres, and an hourly liquid space velocity of from about 0.1 to about 10, in the presence of hydrogen in an amount of from about 500 to about 20,000 standard cubic feet per barrel of charge, with a catalyst comprising an acidic refractory inorganic oxide and a constituent selected from the group consisting of the metals of groups VI and VIII of the periodic table, which improvement comprises introducing to said conversion zone an organic halide and water substantially concurrently with said charge.

As hereinabove set forth, the method of the present invention is broadly utilizable in conjunction with any hydrocracking process employing a cracking-hydrogenation catalyst, that is, a catalyst comprising an acidic cracking component and a hydrogenatively active constituent. These catalysts and the methods of preparation, therefore are well known in the art and therefore only a brief description thereof is given here in order to delineate the general area in which the present invention finds utility. In one form of the catalyst, the cracking component may comprise any suitable cracking catalyst, either naturally occurring or synthetically produced. Naturally occurring cracking catalysts include various aluminum silicates, particularly when acid treated to increase the activity, such as Super Filtrol, etc. Synthetically produced cracking catalysts include silica-alumina, silica-zirconia, silica-alumina-zirconia, silica-magnesia, silica-alumina-magnesia, silica-alumina-thoria, alumina-boria, etc. These catalysts may be made in any suitable manner including separate, successive or co-precipitation methods of manufacture. Of this group, the preferred cracking catalysts comprise silica-alumina or silica-alumina-zirconia containing from about 10% to about 80% by weight of alumina, which are preferably manufactured by commingling an acid, such as hydrochloric acid, sulfuric acid, etc., with commercial water glass under conditions to precipitate silica, washing with acidulated water to remove sodium ions, commingling with an aluminum salt such as aluminum chloride, aluminum sulfide, aluminum nitrate and/or a zirconium salt, etc., and either adding a basic precipitant as ammonium hydroxide to precipitate aluminum and/or zirconia or forming a desired oxide or oxides by thermal decomposition of the salt, as the case may permit. The silica-alumina-zirconia catalyst may be formed by adding the aluminum and/or zirconium salts together or separately. The catalyst may be in the form of granules of irregular size and shape or the ground granules may be formed into pellets of uniform size and shape by pilling, extrusion or other suitable methods. In another form of the catalyst, the cracking component may comprise a halogen-promoted alumina, preferably an alumina which contains combined fluorine or chlorine in an amount of from about 0.1% to about 10% by weight. The halogen may be combined with alumina prior to, during, or subsequently to precipitation of alumina from an alumina hydrosol and is generally added in the form of a hydrogen halide, aluminum halide, or an ammonium halide.

The hydrogenatively active constituent may comprise one or more elements selected from the group consisting of the metals from groups VI and VIII of the periodic table. The metal may be deposited on the acidic component, which thus also serves as a base or support, in any suitable manner such as by impregnation with a decomposable salt, and the resulting composite may thereafter be subjected to one or more alternate oxidation or reduction steps. The oxidation is typically effected in air at 800° to 1600° F. and the reduction in a hydrogen atmosphere at 300° to 1100° F. Preferably the metal in its final form is reduced to its metallic state or at least to a lower valence state. In another form of catalyst, the metal may be deposited on an inert, finely divided carrier and then mechanically mixed with particles of the acidic cracking component. The preferred hydrogenatively active metals are molybdenum, cobalt, nickel, platinum and palladium; when employing molybdenum, cobalt and nickel, concentrations thereof in the final catalyst may range from about 0.01% to about 50% by weight and preferably from about 1% to about 10%; when using platinum or palladium, final concentrations in the range of 0.01% to about 10% are usually employed, with the preferred range being from about 0.05% to about 2% for reasons of economy.

The hydrocracking process itself consists essentially in contacting the charge with the catalyst in the presence of hydrogen under selected conditions of temperature, pressure, space velocity and $H_2$:oil ratio; the hydrocracking conditions are, of course, optimized to produce the desired yield and product distribution, and these conditions will vary over a wide range depending on the nature of the charge and the type of catalyst employed. Typical hydrocracking conditions involve temperatures of from 200° to 900° F., pressures of from 10 to 300 atmospheres, hourly liquid space velocities of from 0.1 to 10 (the hourly liquid space velocity being defined as the volume of liquid hydrocarbon charged per hour per volume of catalyst), and hydrogen circulation rates of from about 500 to about 20,000 standard cubic feet of $H_2$ per barrel of charge. The high activity of the above enumerated cracking-hydrogenation catalysts permits operation at substantially lower temperatures and pressures than those customarily encountered with more conventional nitrogen-insensitive catalysts and the preferred operating conditions when using these more active catalysts involve temperatures of from about 300° to about 750° F., pressure of from about 10 to about 200 atmospheres and space velocities of from about 0.1 to about 3. The process of the present invention may be implemented in any suitable apparatus. A particularly suitable process comprises the well known fixed bed system in which the catalyst is disposed in a reaction zone and the charge stock is passed therethrough at the proper conditions of operation in either upward or downward flow, co-currently or countercurrently to the hydrogen flow. The products are fractionated to separate the desired distillate portions, and the highest boiling portion is frequently recycled to the hydrocracking zone. The present invention is particularly well suited to recycle operation since, in many instances, the recycle stock is considerably less refractory than the charge and may therefore be recycled to extinction. Other suitable units in which the process may be effected include the fluidized type process in which the hydrocarbon and catalyst are maintained in a state of turbulence under hindered settling conditions in the reaction zone, the compact moving bed type process in which the catalyst and hydrocarbon are passed co-currently or countercurrently to each other, and the suspensoid type operation wherein the catalyst is carried as a slurry in the hydrocarbon oil into the reaction zone. Since the hydrocracking reactions result in a net consumption of hydrogen, it is usually advantageous to integrate the hydrocracking unit with a hydrogen-producing process such as a naphtha reforming unit in order to utilize the net hydrogen released therefrom.

The halogen-containing compound and water may be introduced into the feed upstream of the hydrocracking zone or separately injected directly into the hydrocracking zone. Injection may be continuous or intermittent ing injection at sufficiently frequent intervals as to maintain the activity of the catalyst. The halogenous compound and water may be injected at the same or at separate points in the system so long as both materials are simultaneously present in the hydrocracking zone. The water may be handled either in the liquid or in the gas phase, as desired. The halogen-containing compound is one that will readily release its halide ions under hydrocracking conditions and will not contaminate or poison the catalyst; for this reason, metallic halides are generally to be excluded, while the preferred halogen-containing compounds are the hydrogen halides and organic halides such as alkyl and aryl monohalides and polyhalides, halogenated acids, aldehydes, ketones, and the like. The preferred organic halides are those having a relatively high halogen content such as carbon tetrachloride, chloroform, carbon tetrabromide, bromoform, iodoform, methylene iodide, dichloroethanes, trichloroethylenes, tertiary butylchloride, and the like. The rate of halide and water injection will vary widely depending upon the nitrogen content of the feed stock. As a general rule, it has been found that a concentration of halogen, based on the feed, ranging from about 0.5 to about 10 molal parts per million of halogen per molal parts per million of nitrogen in the feed, gives satisfactory results; the corresponding amount of water is from about 2- to about 50-fold the weight parts per million of halogen. A quantity of halide and water in excess of these ranges does not hinder the process but neither does it contribute thereto, while a quantity less than the stated ranges may often prove insufficient to maintain the catalyst activity.

The following examples are introduced to further illustrate the novelty and utility of the present invention but not with the intention of unduly limiting the same.

*Example I*

A desulfurized vacuum gas oil containing 325 parts per million of total nitrogen was subjected to hydrocracking in the presence of a catalyst comprising sulfided nickel-molybdenum deposited on a silica-alumina base containing 63% alumina and 37% silica by weight. Operating conditions were a temperature of 675° F., a pressure of 1500 p.s.i.g., a liquid hourly space velocity of 1.03, and a hydrogen circulation rate of 2964 standard cubic feet of hydrogen per barrel of charge. The catalyst was almost completely deactivated 6 hours after the charge was introduced.

*Example II*

A desulfurized vacuum gas oil containing 15 parts per million of total nitrogen was subjected to hydrocracking in the presence of a platinum-silica-alumina catalyst. The gas oil comprised 20 volume percent of 400° to 650° F. end point material and contained no gasoline.

The catalyst was prepared from a standard 88% silica and 12% alumina cracking catalyst pilled into ⅛" pills and calcined for 3 hours at 1250° F. This catalyst base was then impregnated with a 2% HCl solution containing 1% of the weight of the base as platinum. The impregnated material was then oxidized and dried for 2 hours at 950° F., heated to 1000° F. with dry air, purged with dry nitrogen for 1 hour at 1000° F., and finally reduced with hydrogen for 2 hours, at 1000° F. The final catalyst contianed 0.95% platinum and 0.05% chloride.

Carbon tetrachloride was continuously added to the charge in an amount to give a chloride concentration of 500 parts per million. Operating conditions were a temperature of 675° F., a pressure of 1500 p.s.i.g., a liquid hourly space velocity of 0.5, and a hydrogen circulation rate of 10,000 standard cubic feet of hydrogen per barrel of charge. The activity of the catalyst declined rapidly until it was essentially inactive; the deactivation occurred in less than 48 hours.

*Example III*

The charge stock, catalyst and operating conditions were the same as in Example II, except that chloride and water were continuously added to the charge in an amount to yield a concentration of 20 parts per million of chloride and 200 parts per million of water. The conversion products contained essentially no light gas, only 0.3 weight percent of $C_3$ and $C_4$ materials and 2 weight percent $C_5$ and $C_6$ materials. Principal conversion products included 35 volume percent gasoline, 55 volume percent of 400°–650° F. end point material, and 15 volume percent of material having an Engler end point above 650° F. The liquid volume yield was approximately 110%. The conversion stabilized at this level and continued steadily for at least 125 hours with no decline in catalyst activity.

Increasing the chloride concentration of the feed from 20 to 40 parts per million produced no noticeable effect; however, when the chloride injection was halted, the catalyst activity began to fall rapidly about 12 hours after the chloride was cut out. Subsequent restoration of the chloride injection caused the catalyst to regain its original activity.

A comparison of Examples I, II and III above shows that with no addition of halogen and water, or with addition of halogen only, a low temperature hydrocracking catalyst deactivates rapidly when processing nitrogenous feed stocks. However, as demonstrated by Example III, the simultaneous introduction of halogen and water to the hydrocracking zone renders the catalyst insensitive to nitrogen deactivation and allows the hydrocracking to proceed at a high conversion level and with extreme selectivity toward formation of desirable liquid products.

*Example IV*

A heavy cycle oil containing 20 parts per million of total nitrogen is subjected to hydrocracking at a temperature of 650° F. in the presence of a catalyst comprising 1% platinum, alumina, and 4.5% combined fluorine. Sufficient tertiary butylchloride and water is added to the feed to give concentrations therein of 150 parts per million chloride and 1800 parts per million of water. High liquid yields of almost completely saturated gasoline and distillate fuel fractions will be obtained, and the low temperature hydrocracking activity of the catalyst will continue undiminished.

*Example V*

A vacuum gas oil containing 200 parts per million of total nitrogen is processed at hydrocracking conditions over a catalyst comprising presulfided cobalt-molybdenum, each in the amount of 2% by weight, deposited on a silica-alumina-zirconia support containing 85% silica, 10% alumina and 5% zirconia. Catalyst activity is sustained by maintaining 750 parts per million of chloride and 8000 parts per million of water in the feed.

*Example VI*

A heavy cycle stock containing 150 parts per million of total nitrogen is processed at hydrocracking conditions over a catalyst comprising 0.8% reduced palladium deposited on a silica-alumina base containing 88% silica and 12% alumina. Catalyst activity is sustained by maintaining 570 parts per million of bromide as carbon tetrabromide and 4500 parts per million of water in the feed.

As evidenced by the foregoing specification and examples, the addition of a halide and water to the hydrocracking zone enables the conversion of nitrogenous feed stocks by means of cracking-hydrogenation catalysts to be effected continuously without the decline or cessation of catalyst activity which heretofore has rendered such conversions impractical, if not inoperable. In accordance with this invention, the desirable properties of cracking-hydrogenation catalysts, which are many, may now be put to full advantage. The relatively low temperature range, i.e., 300° to 700° F., over which these catalysts show excellent activity, is substantially below the thermal hydrocracking range; accordingly little or no normally gaseous hydrocarbons are produced, with a resultant increase in liquid yield. Volume yields of from 105% to 120%, based on the charge, are readily obtainable, with up to 90 volume percent of the product having an Engler end point below 650° F. The gasoline fraction of the product is highly naphthenic, usually consisting primarily in $C_6$ rings rather than $C_5$ rings, and therefore provides a highly desirable charge stock for a catalytic reforming operation. The distillate fuel portion of the product is a completely saturated material having a formula of at least $C_nH_{2n}$. The abundance of hydrogen in this portion of the cracked product makes it a considerably superior fuel to those presently produced by conventional cracking processes. The minor portion of the product boiling above 650° F. is also entirely saturated, is less refractory than the charge stock, and may therefore be advantageously recycled to extinction.

We claim as our invention:

1. In the hydrogenative cracking of a nitrogen-containing, relatively high boiling hydrocarbon charge to yield a lower boiling product by subjecting said charge to contact at hydrocracking conditions in a conversion zone with a hydrocracking catalyst, the improvement which comprises introducing to said conversion zone a non-metallic halogen-containing compound and water substantially concurrently with said nitrogen-containing charge.

2. In the hydrogenative cracking of a nitrogen-containing, relatively high boiling hydrocarbon charge to yield a lower boiling product by subjecting said charge to contact at hydrocracking conditions in a conversion zone with a catalyst comprising a solid acidic cracking component and a hydrogenatively active metal, the improvement which comprises introducing to said conversion zone a non-metallic halogen-containing compound and water substantially concurrently with said nitrogen-containing charge.

3. In the hydrogenative cracking of a nitrogen-containing, realtively high boiling hydrocarbon charge to yield a lower boiling product by subjecting said charge to contact at hydrocracking conditions in a conversion zone with a catalyst comprising a solid acidic cracking component and a constituent selected from the group consisting of the metals of groups VI and VIII of the periodic table, the improvement which comprises introducing to said conversion zone a non-metallic halogen-containing compound and water substantially concurrently with said nitrogen-containing charge.

4. The improvement of claim 1 further characterized in that said halogen-containing compound is a hydrogen halide.

5. The improvement of claim 1 further characterized in that said halogen-containing compound is an organic halide.

6. The improvement of claim 1 further characterized in that said halogen-containing compound is an organic chloride.

7. In the hydrogenative cracking of a nitrogen containing, relatively high boiling hydrocarbon charge to yield a lower boiling product by subjecting said charge to contact at hydrocracking conditions in a conversion zone with a catalyst comprising a solid acidic cracking component and a constituent selected from the group consisting of the metals of groups VI and VIII of the periodic table, said cracking component comprising alumina and combined halogen, the improvement which comprises introducing to said conversion zone an organic halide and water substantially concurrently with said nitrogen-containing charge.

8. In the hydrogenative cracking of a nitrogen-containing, relatively high boiling hydrocarbon charge to yield a lower boiling product by subjecting said charge to contact at hydrocracking conditions in a conversion zone with a catalyst comprising alumina, combined halogen, and platinum, the improvement which comprises introducing to said conversion zone an organic halide and water substantially concurrently with said nitrogen-containing charge.

9. In the hydrogenative cracking of a nitrogen-containing, relatively high boiling hydrocarbon charge to yield a lower boiling product by subjecting said charge to contact in a conversion zone at a temperature of from about 200° to about 900° F., a pressure of from about 10 to about 300 atmospheres, and an hourly liquid space velocity of from about 0.1 to about 10, in the presence of hydrogen in an amount of from about 500 to about 20,000 standard cubic feet per barrel of charge, with a catalyst comprising an acidic refractory inorganic oxide and a constituent selected from the group consisting of the metals of groups VI and VIII of the periodic table, the improvement which comprises introducing to said conversion zone an organic halide and water substantially concurrently with said nitrogen-containing charge.

10. The improvement of claim 9 further characterized in that said organic halide comprises an organic chloride.

11. In the hydrogenative cracking of a nitrogen-containing, relatively high boiling hydrocarbon charge to yield a lower boiling product by subjecting said charge to contact in a conversion zone at a temperature of from about 300° to about 750° F., a pressure of from about 10 to about 200 atmospheres, and an hourly liquid space velocity of from about 0.1 to about 3, in the presence of hydrogen in an amount of from about 500 to about 20,000 standard cubic feet per barrel of charge, with a silica-alumina composite containing platinum, the improvement which comprises introducing to said conversion zone an organic chloride and water substantially concurrently with said nitrogen-containing charge.

12. In the hydrocracking of nitrogen-containing hydrocarbon oil heavier than gasoline in a conversion zone in contact with a hydrocracking catalyst which is deactivated by the nitrogen content of the oil, the improvement which comprises introducing to said zone, concurrently with the introducing of said nitrogen-containing oil, a sufficient amount of water and a halogen compound selected from the group consisting of hydrogen halides and organic halides to substantially reduce the catalyst deactivating effect of the nitrogen content of said oil.

References Cited in the file of this patent

UNITED STATES PATENTS

| | | |
|---|---|---|
| 2,479,109 | Haensel | Aug. 16, 1949 |
| 2,518,353 | McKinnis | Aug. 8, 1950 |
| 2,642,384 | Cox | June 16, 1953 |
| 2,642,385 | Berger et al. | June 16, 1953 |
| 2,717,230 | Murray et al. | Sept. 6, 1955 |
| 2,943,049 | Nahin et al. | June 28, 1960 |